United States Patent
Yoshino et al.

(10) Patent No.: US 9,415,630 B2
(45) Date of Patent: Aug. 16, 2016

(54) WHEEL, WHEEL DEVICE AND INVERTED PENDULUM TYPE VEHICLE

(71) Applicant: HONDA MOTOR CO., LTD., Minato-Ku, Tokyo (JP)

(72) Inventors: Tsutomu Yoshino, Saitama (JP); Wataru Yada, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 14/535,356

(22) Filed: Nov. 7, 2014

(65) Prior Publication Data
US 2015/0129327 A1    May 14, 2015

(30) Foreign Application Priority Data
Nov. 14, 2013  (JP) .................................. 2013-236035

(51) Int. Cl.
| | |
|---|---|
| *B60B 19/00* | (2006.01) |
| *B60K 7/00* | (2006.01) |
| *B62K 1/00* | (2006.01) |

(Continued)

(52) U.S. Cl.
CPC ................ *B60B 19/003* (2013.01); *B60K 1/02* (2013.01); *B60K 7/0007* (2013.01); *B62K 1/00* (2013.01); *B62K 3/007* (2013.01); *B60K 17/043* (2013.01); *B60K 2001/0422* (2013.01); *B60K 2007/0046* (2013.01); *B60K 2007/0061* (2013.01); *B60Y 2200/12* (2013.01)

(58) Field of Classification Search
CPC .... B60B 19/003; B60B 19/12; B60B 19/125; B60C 7/08; B60C 7/101
USPC .......................... 180/7.1, 10, 21; 301/5.23, 5.1
See application file for complete search history.

(56) References Cited

U.S. PATENT DOCUMENTS

| | | | |
|---|---|---|---|
| 3,882,885 A | 5/1975 | McCain | |
| 4,237,990 A * | 12/1980 | La ......................... | B60B 19/003 180/21 |

(Continued)

FOREIGN PATENT DOCUMENTS

| | | |
|---|---|---|
| EP | 2597021 A1 | 5/2013 |
| JP | S62-074002 U | 5/1987 |

(Continued)

OTHER PUBLICATIONS

Search Report issued on Sep. 8, 2015 in the corresponding German Patent Application No. 102014223107.8 with English translation.

(Continued)

*Primary Examiner* — Anne Marie Boehler
(74) *Attorney, Agent, or Firm* — Carrier Blackman & Associates, P.C.; William D. Blackman; Anne G. Sabourin (57) ABSTRACT

An omni-wheel of a highly compact and light-weight is provided. The omni-wheel includes a disk-shaped hub member (110), a plurality of support arms (114) extending axially from the peripheral part of the hub member and arranged along a circle concentric to a rotational center line of the hub member at a regular interval, and a free roller (140) rotatably supported by a free end of each support arm around a rotational center line extending tangentially to a circle concentric to the rotational center line of the hub member and passing through a center of the free roller. The present invention also provides a wheel device incorporated with such a wheel and an inverted pendulum type vehicle using such a wheel device as a tail wheel unit.

8 Claims, 10 Drawing Sheets

(51) Int. Cl.
  *B62K 3/00* (2006.01)
  *B60K 1/02* (2006.01)
  *B60K 17/04* (2006.01)
  *B60K 1/04* (2006.01)

(56) References Cited

U.S. PATENT DOCUMENTS

| | | | |
|---|---|---|---|
| 4,926,952 A * | 5/1990 | Farnam | A61G 5/046 180/251 |
| 5,383,715 A | 1/1995 | Homma et al. | |
| 6,757,936 B2 * | 7/2004 | Yamaguchi | B60B 19/003 16/31 R |
| 8,162,092 B2 * | 4/2012 | Takenaka | B60B 19/003 180/221 |
| 2012/0168236 A1 * | 7/2012 | Hamaya | B62K 1/00 180/21 |
| 2012/0256471 A1 * | 10/2012 | Scogna | B60B 19/12 301/5.23 |
| 2015/0130260 A1 * | 5/2015 | Bando | B60B 19/003 301/5.23 |

FOREIGN PATENT DOCUMENTS

| | | |
|---|---|---|
| JP | 3381848 B2 | 3/2003 |
| JP | 2010-006352 A | 1/2010 |
| JP | 2010-195245 A | 9/2010 |

OTHER PUBLICATIONS

Office Action issued on Jul. 5, 2016 in the corresponding Japanese Office Action No. 2013-236035 with an English translation of the relevant portion.

* cited by examiner

WHEEL, WHEEL DEVICE AND INVERTED PENDULUM TYPE VEHICLE

TECHNICAL FIELD

The present invention relates to a wheel, a wheel device and an inverted pendulum type vehicle, and in particular to an omni-wheel, and a wheel device and an inverted pendulum vehicle using the omni-wheel.

BACKGROUND OF THE INVENTION

Various types of omni-wheels are known. An omni-wheel can travel in both longitudinal and lateral directions by using a composite wheel which typically comprises a hub member configured to be rotatably supported and a plurality of free rollers each rotatably supported by the hub member around a rotational center line extending tangentially to a circle concentric to the rotational center line of the hub member and passing through a center of the free roller. See JP3381848B, JP2010-6352A and JP2010-195245A, for instance.

The free rollers are thus arranged on a concentric circle one next to the other such that the gap between each adjacent pair of free rollers is greater in a radially outer part than in a radially inner part. Therefore, the gap in the radially outer part cannot be reduced beyond a certain limit without causing some difficulty in supporting the free rollers because the gap in the radially inner part becomes extremely small. The large gap in the radially outer part prevents a smooth rotation of the hub member around the rotational center line thereof (or a smooth lateral travel of the omni-wheel), and causes undesired vibrations and noises.

This problem could be alleviated by increasing the diameter of the hub member and/or reducing the diameter of each free roller. Increasing the diameter of the hub member undesirably increases the size of the omni-wheel and the necessary number of free rollers so that a compact design cannot be achieved, and the manufacturing cost increases. If the diameter of each free roller is reduced, a smooth longitudinal travel is prevented. This impairs the performance of the omni-wheel.

SUMMARY OF THE INVENTION

In view of such problems of the prior art, a primary object of the present invention is to provide an omni-wheel that can minimize the gap between adjoining free rollers without increasing the number of free rollers.

A second object of the present invention is to provide an omni-wheel that provides a high performance while permitting a highly compact and light-weight design.

According to the present invention, such objects can be accomplished by providing a wheel, comprising: a hub member configured to be rotatably supported and having a peripheral part; a plurality of support arms extending axially from the peripheral part of the hub member and arranged along a circle concentric to a rotational center line of the hub member at a regular interval; and a free roller rotatably supported by a free end of each support arm around a rotational center line extending tangentially to a circle concentric to the rotational center line of the hub member and passing through a center of the free roller.

Thereby, free rollers having a relatively large diameter can be used while permitting the free rollers to be supported such that the gap in the radially inner part between each adjoining pair of free rollers can be minimized.

According to a certain aspect of the present invention, each support arm comprises a plate member having a major plane defined by an axial line and a radial line, and a pair of free rollers are rotatably supported on either side of the plate member.

Thereby, the free rollers can be arranged one next to another in a highly packed manner with a highly simple support structure.

According to a preferred embodiment of the present invention, each support arm has a thickness progressively decreasing from a radial outer end to a radially inner end thereof, and a support shaft extends from each side of the support arm perpendicularly to a corresponding side surface of the support arm to rotatably support the corresponding free roller.

Thereby, each support arm is prevented from interfering with the free rollers even when the free rollers are arranged close to one another while the structural stability of the support arm is ensured. Also, by supporting two free rollers on each support arm, the number of the support arms may be only half as many as the free rollers so that the material cost and the manufacturing cost can be reduced.

According to a particularly preferred embodiment of the present invention, the hub member is provided with a plurality of slots formed in a peripheral edge thereof at a regular circumferential interval, and a base end of each support arm is provided with an inserting portion configured to be fitted in the corresponding slot of the hub member, and includes an engagement feature for retaining the support arm at least against an axial movement toward a free end thereof, the wheel further comprising a retaining member attached to the hub member to retain the base end of each support arm against a radially outward movement.

Thereby, each support arm can be accurately positioned on the hub member highly firmly with a highly simple structure.

According to another aspect of the present invention, the engagement feature of the base end of each support arm comprises a radial groove configured to receive a side edge of the corresponding slot. Furthermore, the engagement feature of the base end of the support arm may comprise a notch formed in a radially inner edge thereof configured to receive an inner edge of the corresponding slot of the hub member.

Thereby, the base end of each support arm can be retained to the peripheral part of the hub member in a highly precise and stable manner by using a highly simple and economical structure.

According to a particularly preferred embodiment of the present invention, the retaining member comprises a plurality of tongue pieces each configured to retain the base end of the corresponding support arm against a radially outward movement.

Thereby, the number of component parts can be reduced so that the manufacturing cost can be reduced, and the assembly work is simplified.

If each tongue piece consists of a spring member, any dimensional errors in the base end of each support arm can be accommodated by the elastic deformation of the tongue piece, and this contributes to a precise positioning of each support arm and the firm retention of the support arm without causing any undue stress.

The present invention also provides a wheel device, comprising: a wheel including a hub member configured to be rotatably supported and having a peripheral part, a plurality of support arms extending axially from the peripheral part of the hub member and arranged along a circle concentric to a rotational center line of the hub member, and a free roller rotatably supported by a free end of each support arm around a rotational center line extending tangentially to a circle concentric to the rotational center line of the hub member and passing through a center of the free roller; and an electric motor provided on a side of the hub member toward which each support arm extends, the electric motor being configured to rotate the hub member around the rotational center thereof; at least a part of the electric motor or a reduction gear device thereof being placed in a space surrounded by the free rollers.

The nesting of a part of the electric motor/reduction gear device in the central space surrounded by the free rollers permits the axial dimension of the wheel device to be reduced.

The wheel device may further comprise a bearing unit supporting an output shaft of the electric motor, a center of the bearing unit axially coinciding with the centers of the free rollers. Preferably, the bearing unit comprises a pair of radial bearings, a mid point between the radial bearings axially coinciding with the centers of the free rollers.

According to this arrangement, the output shaft of the electric motor is prevented from being subjected to any undue bending moment so that the stiffness and the durability of the support structure for the output shaft of the electric motor can be maximized.

The present invention further provides an inverted pendulum type vehicle, comprising: a vehicle body; a main wheel including a plurality of driven rollers arranged in an annular configuration such that each driven roller is freely rotatable around an axial line extending in a tangential direction with respect to the annular configuration of the driven rollers; a drive disk rotatably supported by the vehicle body in a substantially coaxial relationship to the main wheel, and supporting a plurality of drive rollers along a circle concentric to a rotational center of the drive disk, each drive roller engaging the corresponding driven roller and being freely rotatable around a rotational center line thereof in a skewed relationship to the axial line of the corresponding driven roller; a tail wheel support arm extending from the vehicle body in a vertically tiltable manner; and a tail wheel unit attached to a free end of the tail wheel support arm and consisting of the wheel device as defined above; the wheel of the tail wheel unit engaging a ground surface at a point spaced from a point of ground contact by the main wheel.

According to this arrangement, the vehicle is allowed to undergo a yaw movement with the aid of the tail wheel.

BRIEF DESCRIPTION OF THE DRAWINGS

Now the present invention is described in the following with reference to the appended drawings, in which.

DESCRIPTION OF THE PREFERRED EMBODIMENT(S)

Figure 1:
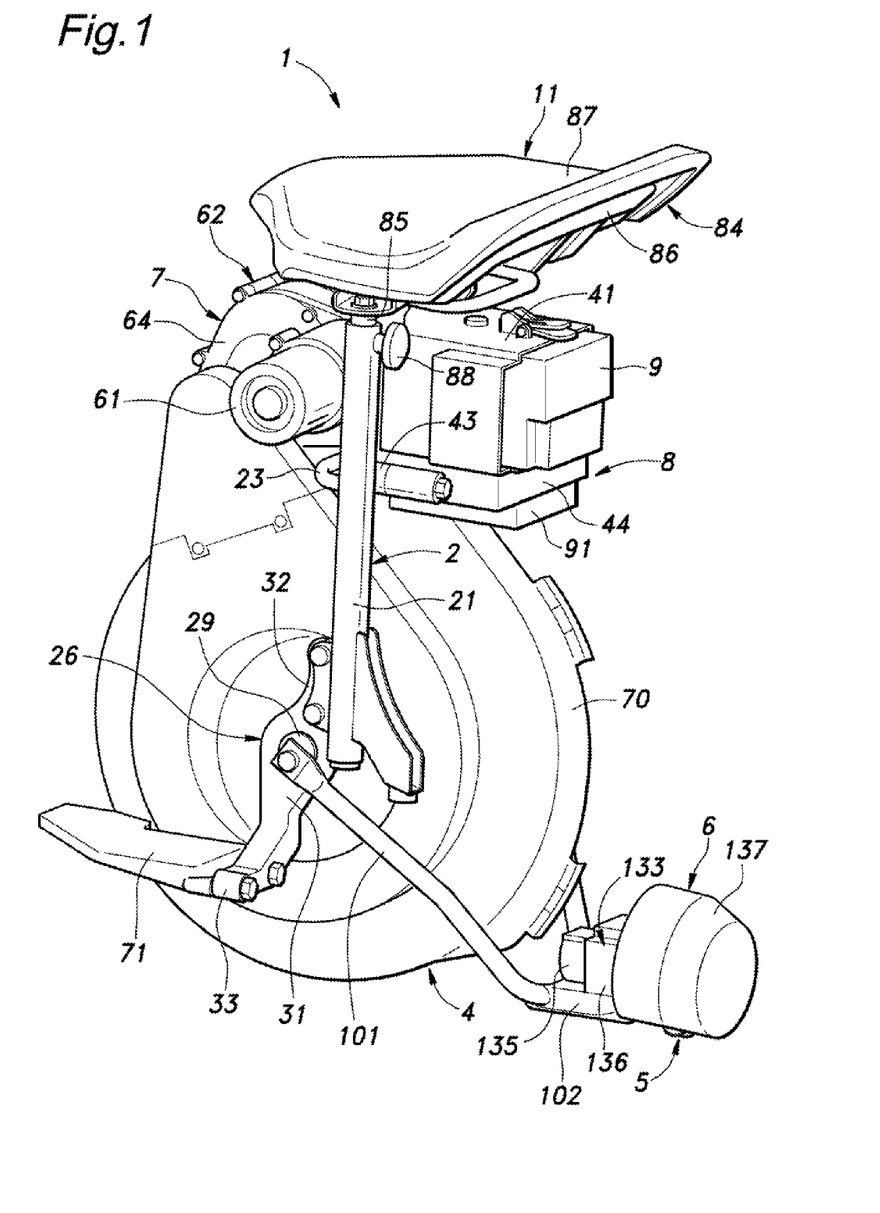
FIG. 1 is a perspective view of an inverted pendulum type vehicle embodying the present invention.
Figure 2:
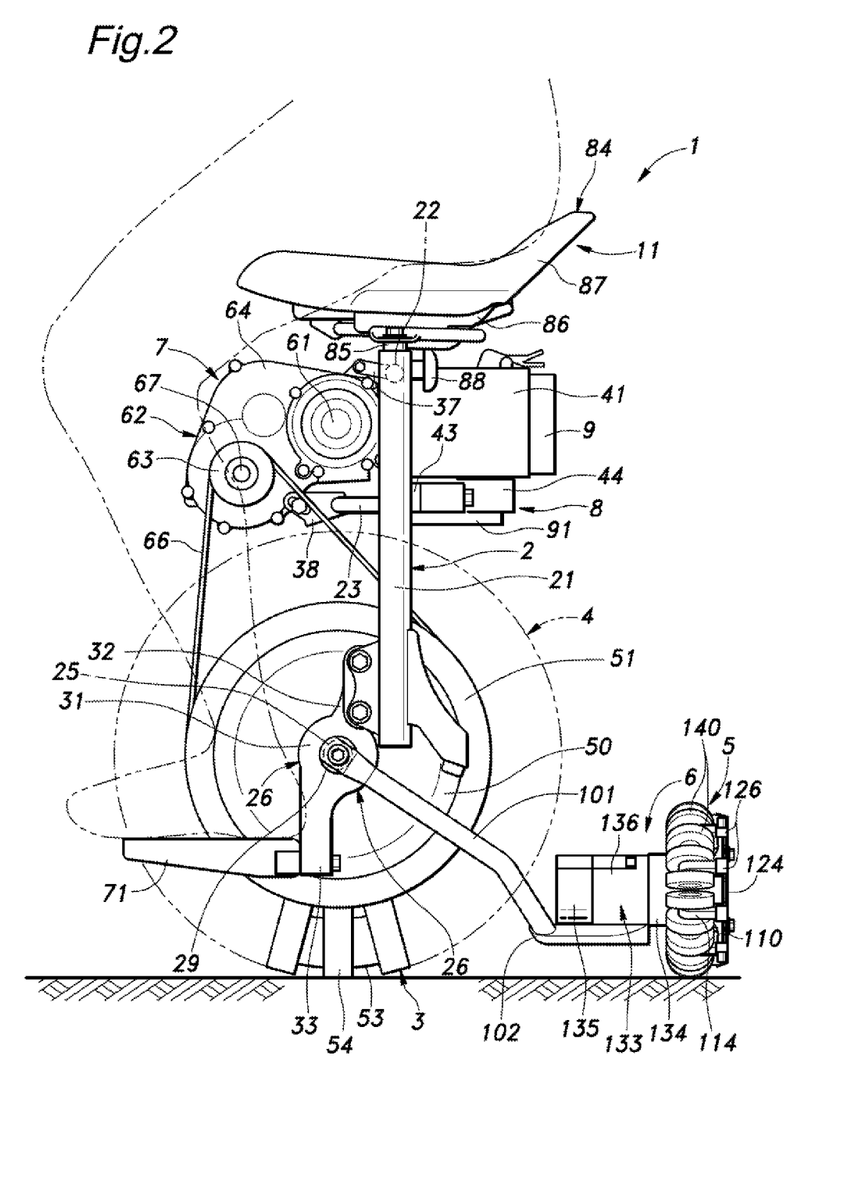
FIG. 2 is a side view of the inverted pendulum type vehicle with a wheel cover removed.
Figure 3:
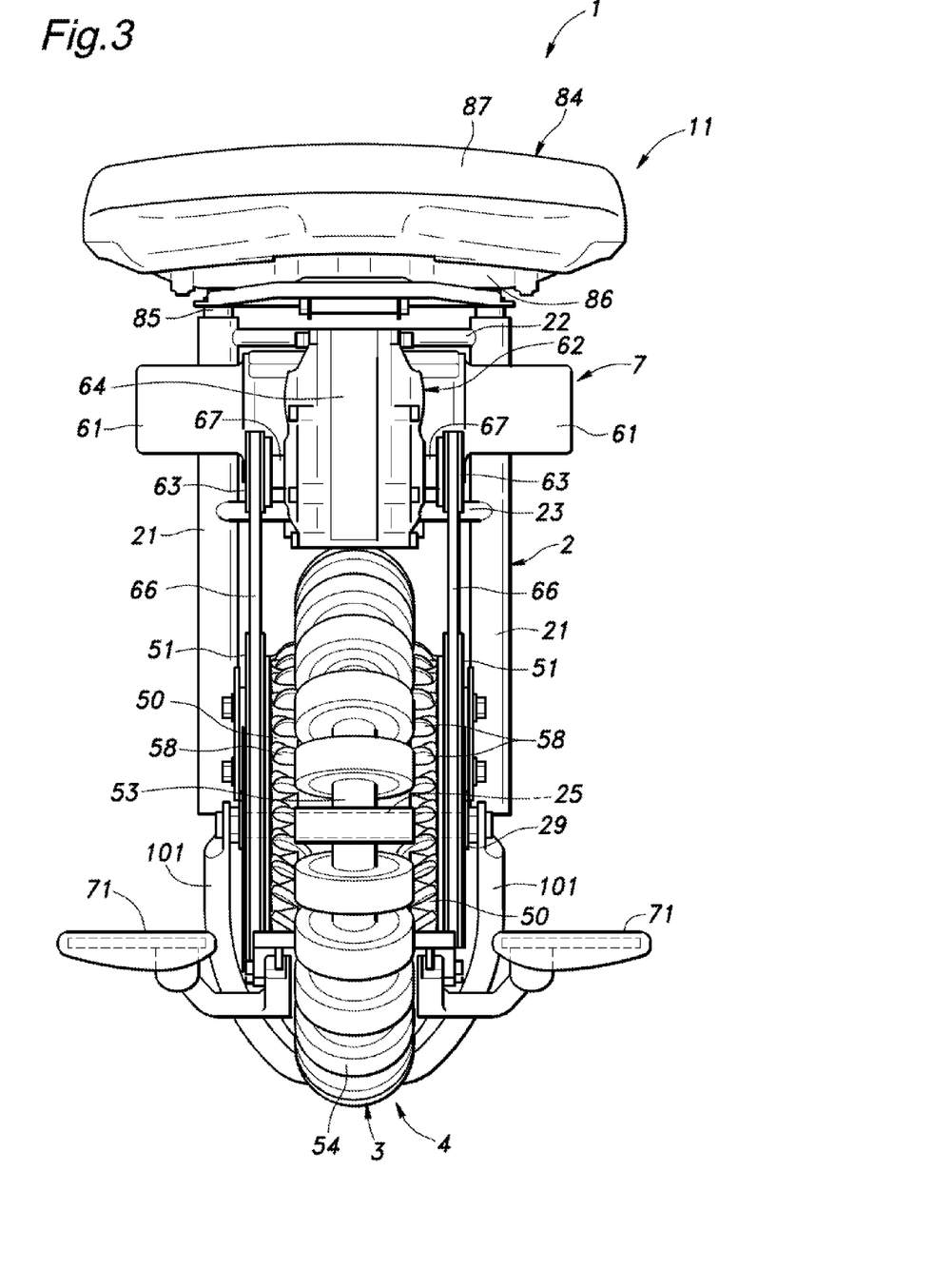
FIG. 3 is a front view of the inverted pendulum type vehicle with the wheel cover removed.

A wheel, a wheel device and an inverted pendulum type vehicle embodying the present invention are described in the following with reference to FIGS. 1 to 3.

The inverted pendulum type vehicle 1 includes a vehicle body frame 2 consisting of a skeletal frame, a main wheel unit 4 incorporated with a main wheel 3, a tail wheel unit 6 incorporated with a tail wheel 5, a drive unit 7 for driving the main wheel unit 4, an electric unit 8 for controlling the drive unit 7 and the tail wheel unit 6, a battery pack 9 for supplying electric power to the electric unit 8, and a saddle unit 11 for seating a rider thereon.

The vehicle body frame 2 includes a pair of side posts 21 each extending vertically, and an upper beam 22 and a middle beam 23 extending laterally and connecting the two side posts 21 with each other.

A mount member 26 is attached to the lower end of each side post 21. The mount member 26 includes a mount base portion 31 forming a part of the vehicle body frame 2 and supporting a disk support shaft 25 of the main wheel unit 4, a post connecting portion 32 extending upward from the mount base portion 31 to be fixedly attached to the corresponding side post 21, and a footrest connecting portion 33 extending downward from the mount base portion 31. A footrest 71 is attached to the footrest connecting portion 33 to support the foot of the rider.

The saddle unit 11 includes a saddle 84 for supporting the buttocks of the rider and a pair of saddle posts 85 for supporting the saddle 84 on the vehicle body frame 2. The saddle 84 includes a base 86 forming a structural frame (bottom plate) and a soft pad 87 placed on the base 86. Each saddle post 85 extends vertically and has an upper end fixedly connected to the lower end of the base 86. Each saddle post 85 is fitted into the upper open end of the corresponding side post 21 to be supported thereby via an adjustment screw 88 which is passed diametrically across the side post 21 and threaded therein. Each saddle post 85 is formed with a plurality of diametrical holes (not shown in the drawings) to receive the adjustment screw 88 therein. These diametrical holes are located at vertically different positions so that the height of the saddle post 85 relative to the side post 21 can be adjusted by selecting the diametrical holes of the saddle post 85 in which the adjustment screw 88 to be received. As a result, the height of the saddle 84 relative to the side post 21 can be adjusted.

A pair of upper brackets 37 are attached to the upper beam 22 such that the upper brackets 37 are laterally spaced from each other and each project forward. A pair of lower brackets 38 are attached to the middle beam 23 such that the lower brackets 38 are laterally spaced from each other and each project forward. The drive unit 7 is attached to these brackets 37 and 38 via screws such that the drive unit 7 is located ahead of the side posts 21.

A battery case 41 for supporting the battery pack 9 is attached to the rear part of the upper beam 22. The battery case 41 consists of a rectangular box having an open rear end, and receives therein the battery pack 9 and a connector (not shown in the drawings) such that the battery pack 9 may be electrically connected to the electric unit 8 via the connector by being received in the battery case 41.

Each side post 21 is provided with an electric unit mounting portion 43 consisting of a welded nut. An electric unit box 44 covering the electric unit 8 can be attached to the side posts 21 by passing mounting screws through the electric unit box 44 and threading into the respective electric unit mounting portions 43. The electric unit box 44 is thus located immediately below the battery case 41 or on a rear part of the side posts 21.

The main wheel unit 4 is positioned between the two mount members 26 and between the two side posts 21. The main wheel unit 4 includes a disk support shaft 25 extending laterally and horizontally, a pair of drive disks 50 supported on the disk support shaft 25 in an independently rotatable manner, the annular main wheel 3 placed between the two drive disks 50 and a pair of driven pulleys 51 for cogged belt fixedly connected to the drive disks 50, respectively.

The main wheel 3 is driven under the inverted pendulum control, and comprises a metallic annular member 53 and a plurality of driven rollers (free rollers) 54 mounted along the length of the annular member 53 and engaging the ground surface. The driven rollers 54 are arranged along the circumferential direction of the annular member 53, and are each rotatable around the tangential line of the annular member 53 at the point where the particular driven roller 54 is located.

The two drive disks 50 each consist of a disk having a smaller diameter than the diameter of (the center line of) the annular member 53, and are each provided with a frusto-conical shape. A plurality of drive rollers 58 are rotatably supported on the outer peripheral part of each drive disk 50 at a regular circumferential interval. The drive rollers 58 of the left drive disk 50 are arranged symmetric to the drive rollers 58 of the right drive disk 50. The rotational center of each drive roller 58 is in a skewed relationship for the rotational center of the drive disks 50. Therefore, the drive rollers 58 are arranged in a symmetric arrangement which is similar to the teeth of a spiral bevel gear.

The outer periphery of each drive roller 58 of each drive disk 50 comes into contact with the outer periphery of the corresponding driven roller 54 of the main wheel 3. Because the drive rollers 58 of the drive disks 50 squeeze the driven rollers 54 from two sides, the main wheel 3 is rotatably supported around the lateral and horizontal axial line without being supported by a shaft. The axial line of each drive roller 58 is in a skewed relationship to the driven roller 54 engaging the drive roller 58.

The drive unit 7 includes a pair of electric motors 61, a reduction gear unit 62 and a pair of drive pulleys 63 for cogged belt. The reduction gear unit 62 includes a single gear case 64, a gear train (not shown in the drawings) for a left electric motor 61 supported in the gear case 64, and a gear train (not shown in the drawings) for a right electric motor 61 supported in the gear case 64. The two electric motors 61 are attached to either side of the gear case 64 in a coaxial relationship. The reduction gear unit 62 is provided with a pair of output shafts 67 of the respective gear trains extending from either side of the gear case 64 in parallel with the rotor shafts of the electric motors 61. The output shaft 67 of the gear train corresponding to the left electric motor 61 projects leftward, and the output shaft 67 of the gear train corresponding to the right electric motor 61 projects rightward. The drive pulleys 63 are attached to the corresponding output shafts 67, respectively.

An endless cogged belt 66 is passed around the drive pulley 63 and the driven pulley 51 located on each side. The drive pulley 63 has a smaller diameter and a fewer number of teeth than the driven pulley 51. Thus, the rotation of the left electric motor 61 is transmitted to the left drive disk 50 via the left gear train of the reduction gear unit 62, the left drive pulley 63, the left cogged belt 66 and the left driven pulley 51. Similarly, the rotation of the right electric motor 61 is transmitted to the right drive disk 50 via the right gear train of the reduction gear unit 62, the right drive pulley 63, the right cogged belt 66 and the right driven pulley 51.

A wheel cover 70 made of plastic material covers the two drive disks 50, the two driven pulleys 51, the two drive pulleys 63 and the two cogged belts 66. The lower end of the wheel cover 70 defines an opening exposing the lower part of the main wheel 3.

A pair of tail wheel support arms 101 are pivotally connected to the respective mount members 26 so as to be vertically rotatable around the axial line of the disk support shaft 25. The rear ends of the tail wheel support arms 101 are jointly connected to a support plate 102 which in turn supports the tail wheel unit 6.

The tail wheel unit 6 includes an electric motor 133 and a reduction gear unit 134 in addition to the tail wheel 5 consisting of an omni-wheel. A housing (outer case) 136 of the electric motor 133 is fixedly attached to the support plate 102.

The electric motor 133 is placed in a front part of the tail wheel unit 6, and the reduction gear unit 134 and the tail wheel 5 are placed to the rear of the electric motor 133 such that the electric motor 133 is attached to a position of the tail wheel support arms 101 more forwardly than the tail wheel 5. A rotational angle sensor 135 for detecting the rotational angle of the output shaft of the electric motor 133 is attached to the front end of the electric motor 133. A tail wheel cover 137 is attached to the support plate 102 so as to cover the two lateral sides, the upper side and the rear end of the tail wheel 5.

The tail wheel 5 is provided with a central axial line extending horizontally in the fore and aft direction, and is configured to engage the ground surface at a point displaced to the rear from the ground contact point of the main wheel 3 under the own weight thereof. The tail wheel 5 can be rotatively actuated by the electric motor 133 around the central axial line thereof. The tail wheel unit 6 will be described in greater detail later in this description.

The electric unit 8 includes a gyro sensor 91 as well as a main wheel PDU, a tail wheel PDU, a DC-DC converter and an I/O unit (which are not shown in the drawings). The main wheel PDU is a power drive unit for controlling the drive unit 7, and the tail wheel PDU is a power drive unit for controlling the tail wheel unit 6. The DC-DC converter converts the DC voltage supplied by the battery pack 9 to a prescribed lower DC voltage. The gyro sensor 91 detects the inclination angle and the angular speed of the vehicle body frame 2 with respect to a prescribed axial line (a plumb vertical line, for instance). The main wheel PDU, the tail wheel PDU, the DC-DC converter and the I/O unit are received in a rectangular electric unit box 44.

The electric unit box 44 is fixedly secured to the electric unit mounting portions 43 provided on either side post 21 by using screws, and is positioned behind the battery case 41 and above the main wheel unit 4. When viewed from a side, the electric unit box 44 is in most part located behind the side posts 21. The gyro sensor 91 is attached to the bottom surface of the electric unit box 44, and is located vertically between the electric unit box 44 and the main wheel unit 4.

The mode of operation of the inverted pendulum type vehicle 1 is described in the following. The main wheel PDU constantly computes the position of the gravitational center of the inverted pendulum type vehicle 1 including the rider seated on the saddle unit 11 from the inclination angle and angular speed of the vehicle body frame 2 in the lateral and fore and aft directions measured by the gyro sensor 91.

When the gravitational center of the inverted pendulum type vehicle 1 including the rider seated on the saddle unit 11 is at the neutral position (such as a position directly above the disk support shaft 25) the electric motors 61 of the drive unit 7 are driven under the inverted pendulum control principle so that the vehicle body frame 2 is maintained in an upright posture.

At this time, the tail wheel PDU which is controlled under the steering control principle keeps the electric motor 133 of the tail wheel unit 6 stationary. As a result, the tail wheel 5 remains stationary.

When the gravitational center of the inverted pendulum type vehicle 1 including the rider has shifted forward from the neutral position, the main wheel PDU rotates the electric motors 61 of the drive unit 7 both in the normal direction at a same speed under the inverted pendulum control principle. The electric motors 61 rotate the two drive disks 50 around the central axial line thereof in the normal direction or in the direction for the forward movement at the same speed. As there is no difference between the rotational speeds of the two drive disks 50, the drive rollers 58 of the drive disks 50 and the driven rollers 54 of the main wheel 3 do not rotate around their respective axial lines so that the inverted pendulum type vehicle 1 travels straight ahead.

When the gravitational center of the inverted pendulum type vehicle 1 including the rider has shifted rearward from the neutral position, the main wheel PDU rotates the electric motors 61 of the drive unit 7 both in the reverse direction at a same speed under the inverted pendulum control principle. The electric motors 61 rotate the two drive disks 50 around the central axial line thereof in the reverse direction or in the direction for the rearward movement at the same speed. As there is no difference between the rotational speeds of the two drive disks 50, the drive rollers 58 of the drive disks 50 and the driven rollers 54 of the main wheel 3 do not rotate around their respective axial lines so that the inverted pendulum type vehicle 1 travels straight rearward.

When the vehicle 1 travels either forward or rearward, the stationary condition of the electric motor 133 of the tail wheel unit 6 is maintained under the steering control principle so that the tail wheel 5 is not steered in either lateral direction while free rollers 140 (which will be described hereinafter) of the tail wheel 5 which engage the road surface rotate as the vehicle 1 moves forward or rearward.

When the gravitational center of the inverted pendulum type vehicle 1 including the rider has shifted either leftward or rightward from the neutral position, the main wheel PDU rotates the electric motors 61 of the drive unit 7 in different directions and/or at different speeds under the inverted pendulum control principle. This causes a difference between the rotational speeds of the two drive disks 50 around the central axial line thereof, and hence a difference in the speeds of the circumferences of the drive disks 50 where the drive rollers 58 are rotatably mounted so that the driven rollers 54 are caused to rotate around the respective axial centers thereof. This creates a lateral propulsion force in the main wheel 3 so that the vehicle 1 is caused to travel in a lateral direction or in an oblique direction.

The rotation of the driven rollers 54 is caused by the difference between the rotational speeds of the two drive disks 50. For instance, if the two drive disks 50 are rotated in different directions at a same speed, the main wheel 3 does not rotate around the axial center thereof while the driven rollers 54 rotate around the respective axial centers thereof so that the main wheel 3 is displaced laterally, and the vehicle 1 travels laterally. It the two drive disks 50 are rotated in a same direction at different speeds, not only the main wheel rotates around the axial center thereof but also the driven rollers 54 rotate around the respective axial centers thereof so that the vehicle 1 is caused to travel in an oblique direction.

When the tail wheel PDU drives the electric motor 133 of the tail wheel unit 6 under the steering control principle, the resulting rotation of the tail wheel 5 causes a yaw movement of the vehicle 1.

The tail wheel unit 6 including the tail wheel 5 is described in the following with reference to FIGS. 4 to 9.

The tail wheel 5 includes a disk-shaped hub member 110 consisting of stamped sheet metal. The hub member 110 includes a circular central part 110A, an annular peripheral part 110B extending in parallel with the central part with a small axial offset and a conical part 110C extending between the central part 110A and the peripheral part 110B such that the hub member 110 is provided with a dish-shape as a whole.

Figure 8:
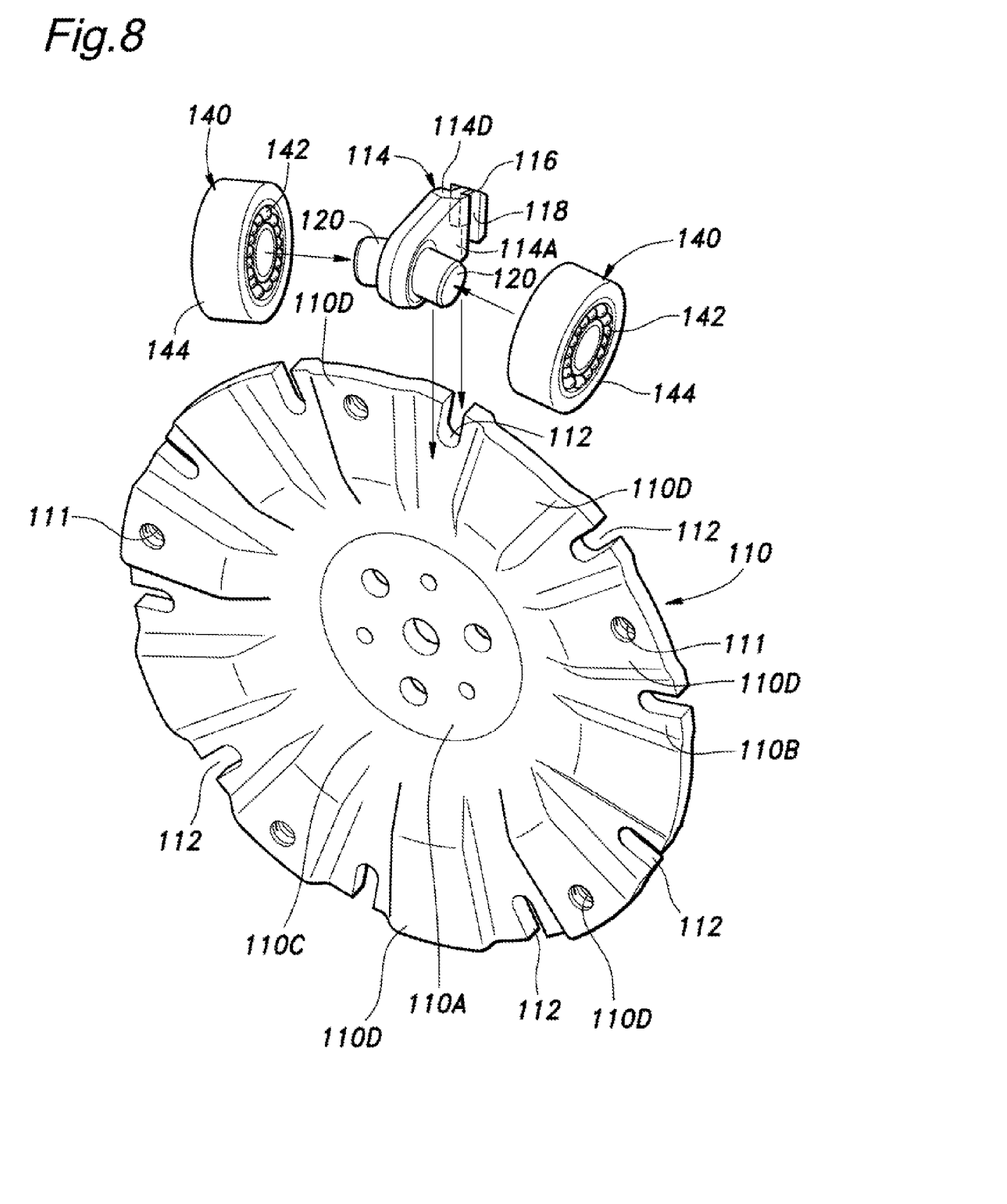
FIG. 8 is an exploded perspective view of the tail wheel unit.

The peripheral part 110B of the hub member 110 is provided with a plurality (10 in the illustrated embodiment) of radial slots 112 along the outer peripheral edge thereof at a regular interval. A radial rib 110D for reinforcement is formed between each adjoining pair of radial slots 112.

A circular ridge or a folding line is defined between the peripheral part 110B and the conical part 110C, and between the conical part 110C and the central part 110A. These circular ridges combined with the radial ribs 110D provide a high stiffness (in particular a high bending stiffness) to the hub member 110.

Figure 9:
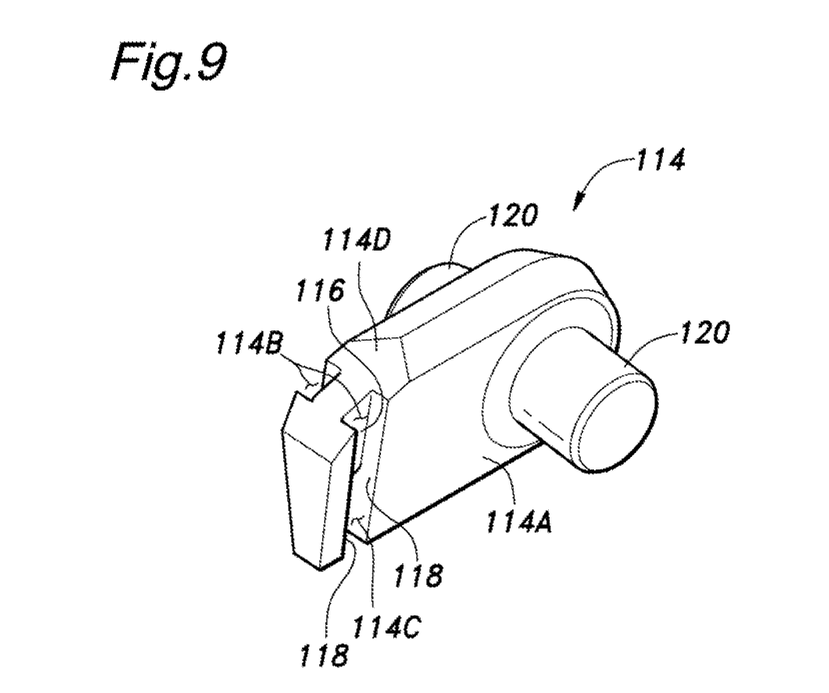
FIG. 9 is a perspective view of a support arm of the tail wheel unit.

An axially and rearwardly extending support arm 114 is retained in each radial slot 112 of the hub member 110. Each support arm 114 consists of an elongated piece of metal plate defining a pair of side faces 114A facing the circumferential direction of the hub member 110.

The base end of each support arm 114 is provided with an inserting portion 116 configured to be fitted into the corresponding slot 112 of the hub member 110. The inserting portion 116 includes a pair of vertical (widthwise) grooves 114B formed on either side face 114A of the base end of the support arm 114, and the lower half of the grooves 114B are cut through the thickness of the support arm 114 thereby defining a notch 114C. The width of the grooves 114B is substantially equal to or slightly greater than the thickness of the peripheral part 110B of the hub member 110 so that the base end of the support arm 114 may be snugly fitted into the corresponding slot 112 of the hub member 110. As the inner edge of the slot 112 is fitted into the notch 114C, the support arm 114 can be securely retained on the peripheral part 110B of the hub member 110. The grooves 114B and the notch 114C form an engagement portion 118. The upper end of the support arm 114 is defined by a slanted surface 114D slanting toward the center of the hub member 110.

Each support arm 114 is provided with a wedge shaped cross section such that the thickness of the support arm 114 decreases toward the central axial line of the hub member 110. A pair of support shafts 120 extend from either side face 114A of the hub member 110 perpendicularly to the corresponding side face 114A. The support shafts 120 may be formed integrally with the support arm 114 by forging, for instance.

The circumferential positioning of each support arm 114 can be accomplished by interposing the base end of the support arm 114 between the side edges of the corresponding radial slot 112. The axial positioning of each support arm 114 can be accomplished by receiving the side edges of the corresponding radial slot 112 in the vertical (radial) grooves 114B in the base end of the support arm 114. This engagement also restricts the lateral tilting of the support arm 114. The engagement between the notch 114C and the inner edge of the slot 112 restricts the vertical tilting of the support arm 114. Therefore, each support arm 114 can be fixedly retained by the peripheral part 110B of the hub member 110 simply by fitting the base end of the support arm 114 in the corresponding radial slot 112 of the hub member 110.

To the back (rear side) of the hub member 110 is attached an annular retaining member 124 having a substantially same outer diameter as the hub member 110 and made of stamp formed sheet metal by using five screws 122 passed through holes formed in the annular retaining member 124 at a regular interval and threaded into threaded holes formed in the outer peripheral part of the hub member 110. The outer peripheral part of the annular retaining member 124 is provided with a plurality of tongue pieces 126 each configured to engage the slanted surface in the base end of the corresponding support arm 114. Each tongue piece 126 engages the base end of the corresponding support arm 114 with a certain resilient force so that the support arm 114 is positively prevented from being dislodged from the corresponding slot 112 in the radially outward direction.

In this manner, each support arm 114 can be fixedly secured to the prescribed position of the hub member 110 with a precise positioning with respect to the circumferential, radial and axial directions in a highly simple and reliable manner. In particular, a plurality (10 in this case) of support arms 114 can be fixedly secured simultaneously by using a single retaining member 124 and five screws 122 so that the number of component parts can be reduced, the assembly work is simplified, and the weight can be reduced.

Because each support arm 114 is secured by using the corresponding tongue piece 126 with a certain resiliency, even when there are some dimensional variations in the support arm 114 and the grooves 114B, the support arms 114 can be secured by using a single retaining member 124 owing to the resiliency of the tongue pieces 126.

Figure 4:
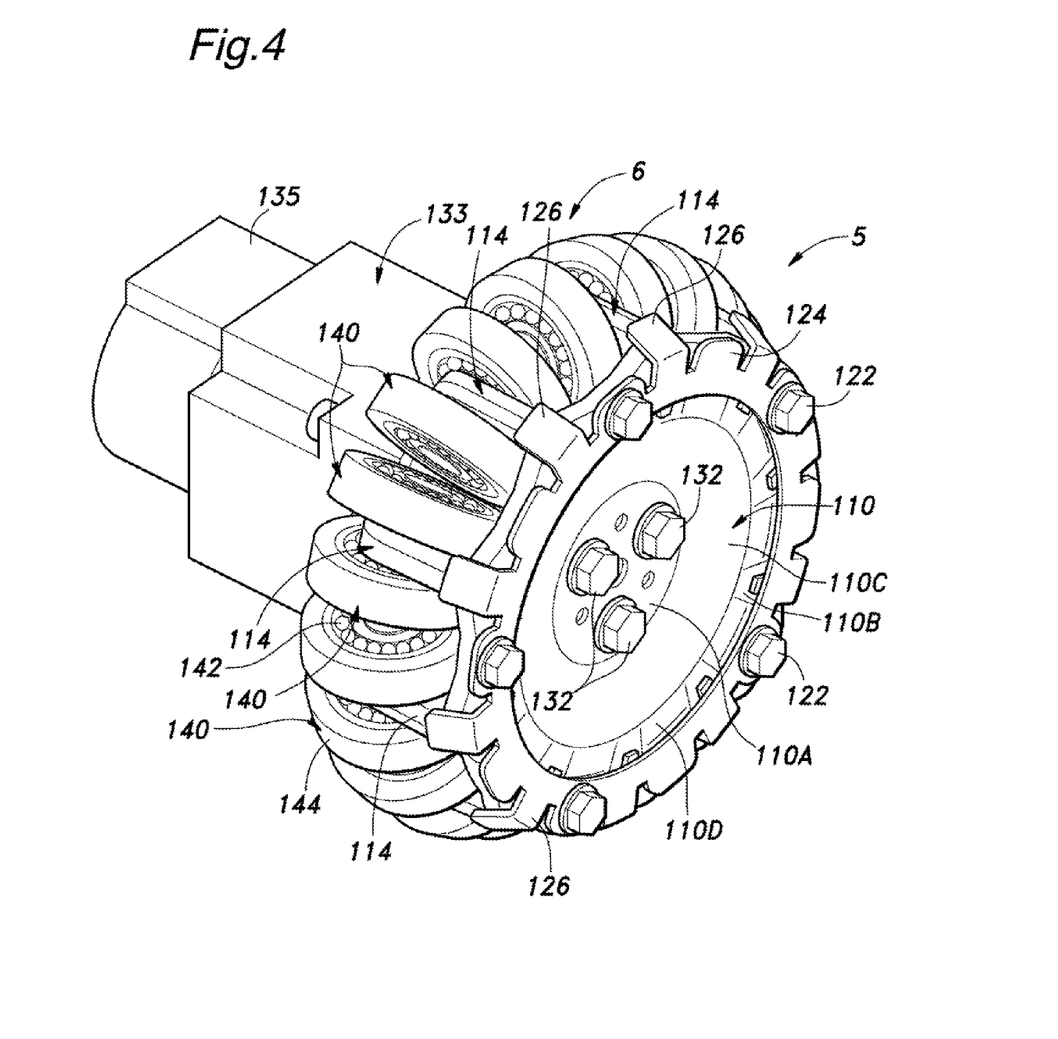
FIG. 4 is a perspective view of a tail wheel unit of the inverted pendulum type vehicle.
Figure 5:
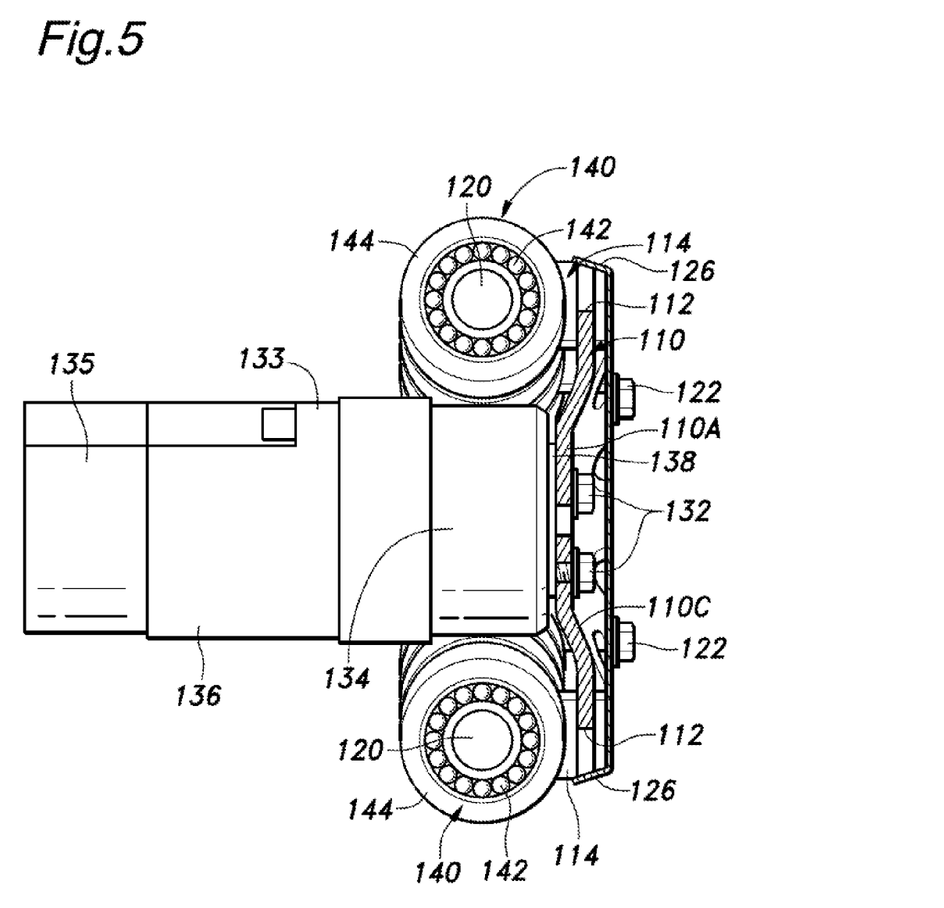
FIG. 5 is a sectional view of the tail wheel unit.

When assembled, the support arms 114 project from the hub member 110 in the axial direction at a regular circumferential interval. As the support arms 114 project forward or away from the retaining member 124, the support shafts 120 are located ahead of the hub member 110 by a certain distance.

Figure 6:
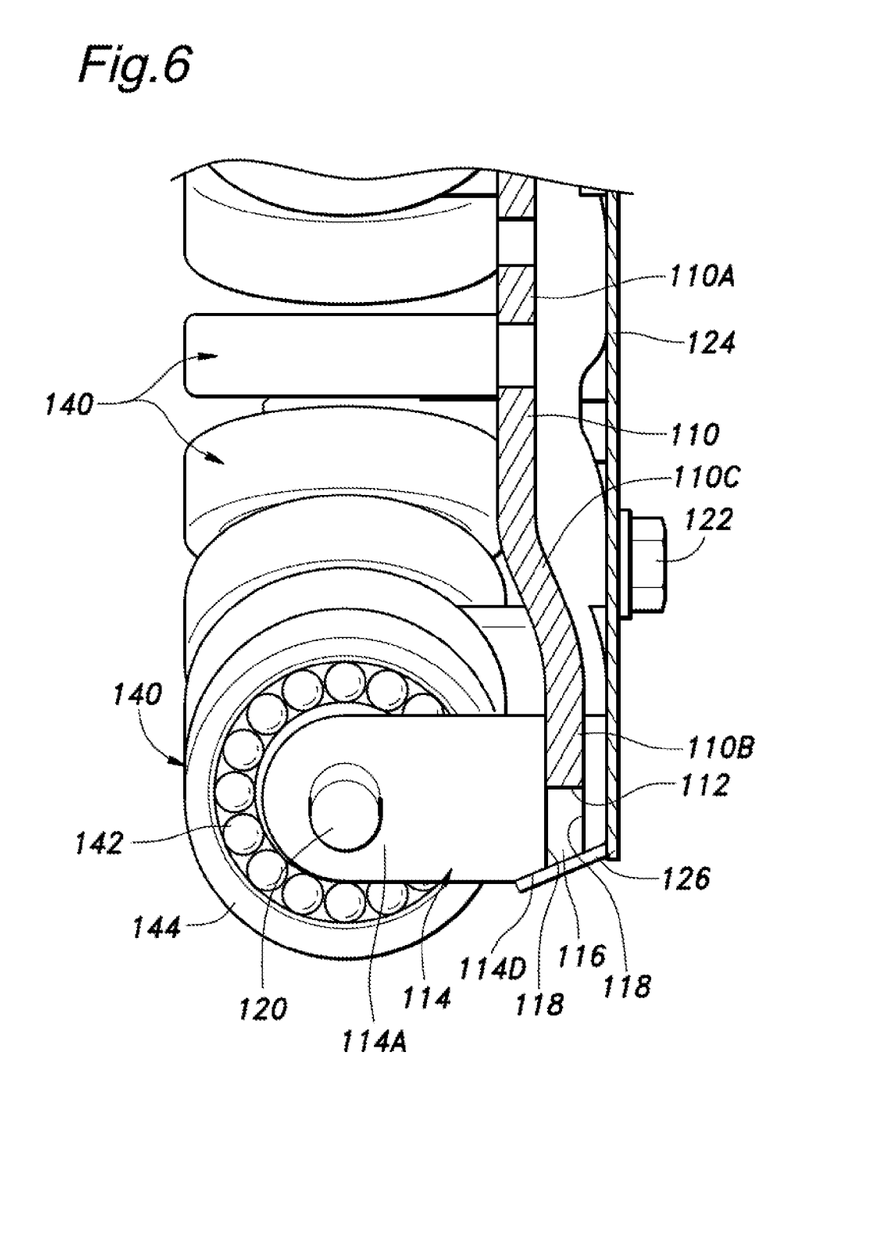
FIG. 6 is an enlarged fragmentary view of a part of FIG. 5.

A pair of support shafts 120 extends from either side of each support arm 114, and a free roller 140 is supported by each support shaft 120. The free roller 140 consists of a ball bearing 142 and a rubber layer 144 attached to the outer periphery of the outer race of the ball bearing 142 by vulcanization. Each support shaft 120 is press fitted into the inner race of the ball bearing 142.

Thus, each support shaft 120 supports a free roller 140 in the manner of a cantilever such that the free roller 140 is rotatable around the axial line thereof which extends in the tangential direction of the circle concentric to the hub member 110 and passing the support shaft 120. Therefore, the support arms 114 may be only half as many as the free rollers 140 so that the number of component parts can be reduced, the assembly work is simplified, and the weight can be reduced.

The front side of the central part 110A of the hub member 110 is attached to the rear end of a rotational output member 138 of the reduction gear unit 134 with three screws 132. In other words, the electric motor 133 and the reduction gear unit 134 are placed on the side (front side) to which the support arms 114 extend, and the hub member 110 can be rotatively actuated around the central axial line thereof. Because at least a part of the electric motor 133 and the reduction gear unit 134 is received in a space surrounded by the free rollers 140 or axially overlaps with the free rollers 140, the axial dimension of the tail wheel unit 6 can be minimized.

Figure 7:
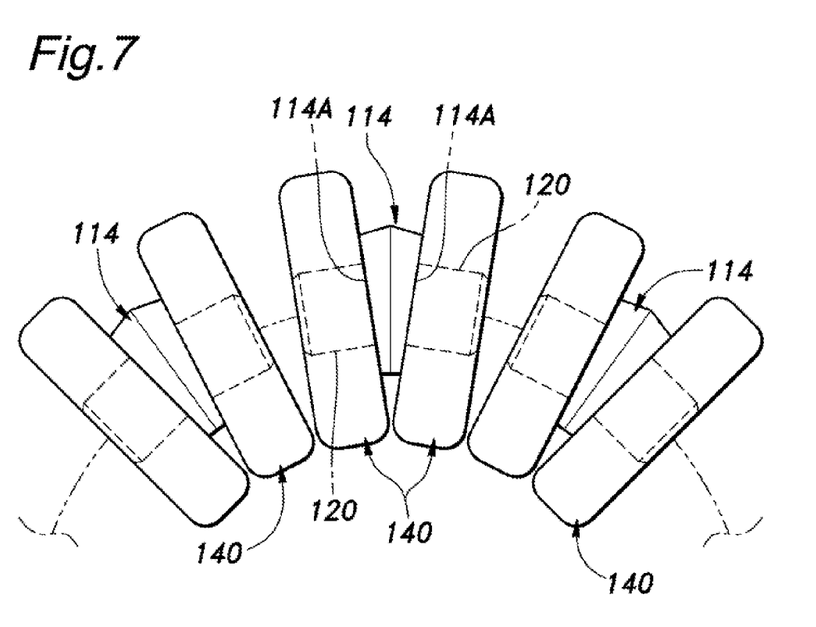
FIG. 7 is a fragmentary front view of the wheel of the tail wheel unit.

In the illustrated embodiment, because the free rollers 140 are amounted on the support arms 114 extending in the axial direction from the hub member 110 via the support shafts 120, the free rollers 140 may be arranged along a circle which is coaxial to the hub member 110 and has a smaller diameter than the outer periphery of the hub member 110.

Thereby, the gap between the adjoining pair of free rollers 140 can be minimized without increasing the number of the free rollers 140 so that the size and weight of the tail wheel 5 can be minimized without creating the problems of vibrations and noises. Therefore, the tail wheel 5 can provide the functionality of an omni-wheel with a highly compact and durable structure, and is therefore highly suitable for allowing a yaw movement to the inverted pendulum type vehicle 1.

In the illustrated embodiment, because at least a part of the electric motor 133 and the reduction gear unit 134 is received in a space surrounded by the free rollers 140 or axially overlaps with the free rollers 140, the axial dimension of the tail wheel unit 6 can be minimized. This contributes to the compact design of the tail wheel unit 6. In particular, by minimizing the distance between the main wheel 3 and the tail wheel 5, the foot print of the vehicle 1 can be minimized, and the vehicle 1 is enabled to turn even in a highly restricted space.

Figure 10:
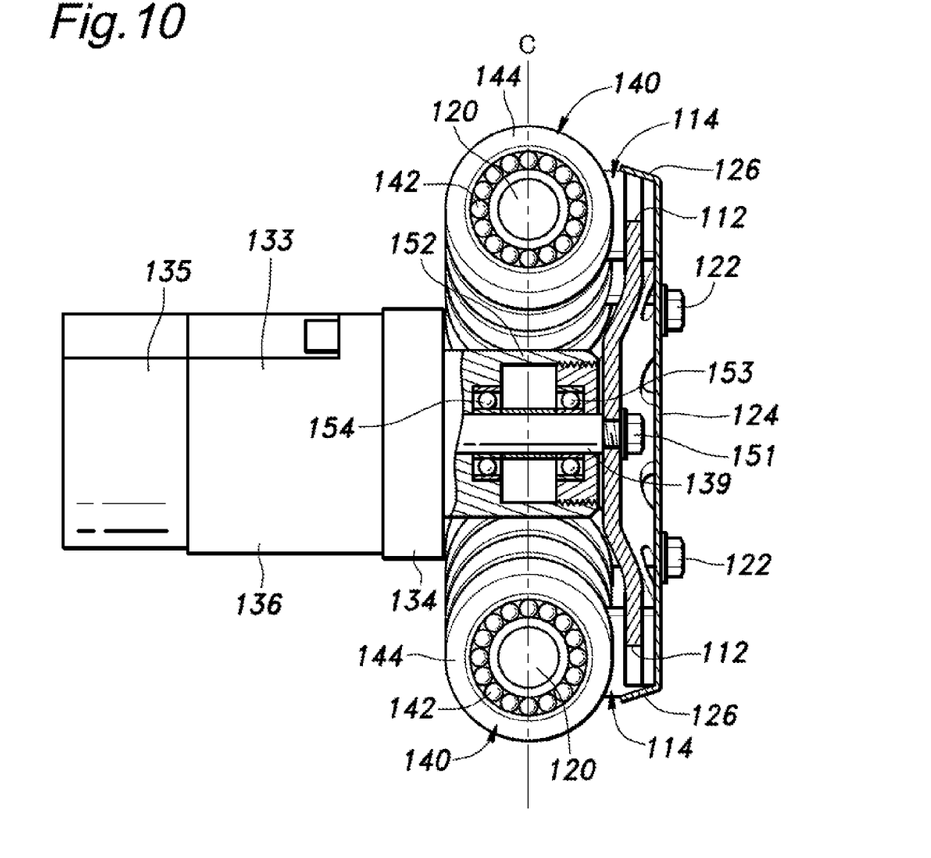
FIG. 10 is a view similar to FIG. 5 showing a second embodiment of the present invention.

FIG. 10 shows an alternate embodiment of the tail wheel unit 6. In the description of this embodiment, the parts corresponding to those of the previous embodiment are denoted with like numerals without necessarily repeating the description of such parts. In this embodiment, the output shaft 139 of the reduction gear unit 134 is connected to the hub member 110 of the tail wheel 5 with a screw 151, and is supported by a housing 152 fixed to the electric motor 133 and the reduction gear unit 134 via a pair of ball bearings 153 and 154 which are axially spaced apart from each other. The free rollers 140 are supported by the support arms 114 via the support shafts 120, and the center line of the support shafts 120 is located in the middle point of the two ball bearings 153 and 154 with respect to the axial direction.

Thereby, the moment acting on the support structure for the tail wheel 5 can be minimized, and the support stiffness for the tail wheel 5 can be maximized.

Although the present invention has been described in terms of preferred embodiments thereof, it is obvious to a person skilled in the art that various alterations and modifications are possible without departing from the scope of the present invention.

For instance, the support arms 114 may be integrally formed with the hub member 110 by stamping, forging or welding. Each support arm 114 may also be provided with a single support shaft to rotatively support a free roller. The support arm 114 may not be wedge-shaped, and each support shaft 120 may extend approximately tangentially to a circle concentric to the hub member 110 and passing the support shafts. The hub member 110 may not be disk-shaped but may have other different shapes as long as the support shafts 120 may be arrange along a common circle concentric to the hub member 110. The retaining member 124 may also consist of a plurality of pieces.

The contents of the original Japanese patent application on which the Paris Convention priority claim is made for the present application as well as the contents of the prior art references mentioned in this application are incorporated in this application by reference.

The invention claimed is:
1. A wheel comprising:
 a hub member configured to be rotatably supported and having a peripheral part;
 a plurality of support arms extending axially form the peripheral part of the hub member and arranged along a circle concentric to a rotational center line of the hub member at regular intervals; and a free roller rotatably supported by a free end of each support arm around a rotational center line extending tangentially to a circle concentric to the rotational center line of the hub member and passing through a center of the free roller, wherein each support arm comprises a plate member having a major plane defined by an axial line and a radial line, and a pair of free rollers are rotatably supported on either side of the plate member, wherein the hub member is provided with a plurality of slots formed in a peripheral edge thereof at a regular circumferential interval, and a base end of each support arm is provided with an inserting portion configured to be fitted in the corresponding slot of the hub member, and includes an engagement feature for retaining the support arm at least against an axial movement toward a free end thereof, the wheel further comprising a retaining member attached to the hub member to retain the base end of each support arm against a radially outward movement, wherein the retaining member comprises a plurality of tongue pieces each configured to retain the base end of the corresponding support arm against a radially outward movement, and wherein each tongue piece consists of a spring member.

2. The wheel according to claim 1, wherein each support arm has a thickness progressively decreasing from a radial outer end to a radially inner end thereof, and a support shaft extends from each side of the support arm perpendicularly to a corresponding side surface of the support arm to rotatably support the corresponding free roller.

3. The wheel according to claim 1, wherein the engagement feature of the base end of each support arm comprises a radial groove configured to receive a side edge of the corresponding slot.

4. The wheel according to claim 1, wherein the engagement feature of the base end of the support arm comprises a notch formed in a radially inner edge thereof configured to receive an inner edge of the corresponding slot of the hub member.

5. A wheel device, comprising:
a wheel according to claim 1, and
an electric motor provided on a side of the hub member toward which each support arm extends, the electric motor being configured to rotate the hub member around the rotational center thereof;
wherein at least a part of the electric motor or a reduction gear device thereof being placed in a space surrounded by the free rollers.

6. The wheel device according to claim 5, further comprising a bearing unit supporting an output shaft of the electric motor, a center of the bearing unit axially coinciding with the centers of the free rollers.

7. The wheel device according to claim 6, wherein the bearing unit comprises a pair of radial bearings, a mid point between the radial bearings axially coinciding with the centers of the free rollers.

8. An inverted pendulum vehicle, comprising:
a vehicle body;
a main wheel including a plurality of driven rollers arranged in an annular configuration such that each driven roller is freely rotatable around an axial line extending in a tangential direction with respect to the annular configuration of the driven rollers;
a drive disk rotatably supported by the vehicle body in a substantially coaxial relationship to the main wheel, and supporting a plurality of drive rollers along a circle concentric to a rotational center of the drive disk, each drive roller engaging the corresponding driven roller and being freely rotatable around a rotational center line thereof in a skewed relationship to the axial line of the corresponding driven roller;
a tail wheel support arm extending from the vehicle body in a vertically tiltable manner; and
a tail wheel unit attached to a free end of the tail wheel support arm including a wheel device;
the wheel device of the tail wheel unit engaging a ground surface at a point spaced from a point of ground contact by the main wheel,
the wheel device comprising:
a wheel including a hub member configured to be rotatably supported and having a peripheral part, a plurality of support arms extending axially from the peripheral part of the hub member and arranged along a circle concentric to a rotational center line of the hub member, and a free roller rotatably supported by a free end of each support arm around a rotational center line extending tangentially to a circle concentric to the rotational center line of the hub member and passing through a center of the free roller; and
an electric motor provided on a side of the hub member toward which each support arm extends, the electric motor being configured to rotate the hub member around the rotational center thereof;
at least a part of the electric motor or a reduction gear device thereof being placed in a space surrounded by the free rollers.

* * * * *